(12) United States Patent
Wu et al.

(10) Patent No.: US 12,206,574 B2
(45) Date of Patent: Jan. 21, 2025

(54) SYSTEMS AND METHODS FOR DETECTING COMMUNICATION LINK BREAKS

(71) Applicant: Comcast Cable Communications, LLC, Philadelphia, PA (US)

(72) Inventors: Chuchu Wu, Penn Valley, PA (US); Patrick Carretas, Chester Springs, PA (US); Gulrukh Ahanger, Ardmore, PA (US); Jacques Louvet, Glenmoore, PA (US); Fnu Venu Gopal Krishna Murthy, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 648 days.

(21) Appl. No.: 16/775,104

(22) Filed: Jan. 28, 2020

(65) Prior Publication Data

US 2021/0234795 A1    Jul. 29, 2021

(51) Int. Cl.
*H04L 45/28* (2022.01)
*H04L 45/00* (2022.01)
*H04L 45/24* (2022.01)
*H04L 47/10* (2022.01)
*H04L 69/323* (2022.01)

(52) U.S. Cl.
CPC .............. *H04L 45/28* (2013.01); *H04L 45/22* (2013.01); *H04L 45/245* (2013.01); *H04L 47/10* (2013.01); *H04L 69/323* (2013.01)

(58) Field of Classification Search
CPC ......... H04L 45/28; H04L 47/10; H04L 45/22; H04L 45/245; H04L 69/323
See application file for complete search history.

(56) References Cited

U.S. PATENT DOCUMENTS

| | | | |
|---|---|---|---|
| 9,877,214 B1* | 1/2018 | Archer | H04W 24/08 |
| 2004/0107382 A1* | 6/2004 | Doverspike | H04L 45/28 |
| | | | 714/4.1 |
| 2010/0111522 A1* | 5/2010 | Yang | H04L 43/0823 |
| | | | 398/17 |
| 2015/0074806 A1* | 3/2015 | Roundy | H04L 63/1425 |
| | | | 726/23 |
| 2016/0218914 A1* | 7/2016 | Astigarraga | H04L 41/0686 |
| 2016/0277247 A1* | 9/2016 | Kim | H04L 41/0826 |
| 2016/0344652 A1* | 11/2016 | Ashwood-Smith | H04L 41/12 |
| 2017/0012848 A1* | 1/2017 | Zhao | H04L 43/04 |
| 2019/0165988 A1* | 5/2019 | Wang | H04L 41/064 |

* cited by examiner

*Primary Examiner* — Huy D Vu
*Assistant Examiner* — Robert Ma
(74) *Attorney, Agent, or Firm* — BakerHostetler

(57) ABSTRACT

Systems and methods for detecting one or more physical communication link breaks are disclosed. An indication of a failure of one or more network layer links may be received. A physical layer link associated with the one or more network layer links may be determined based on the indication of the failure, and based on data indicating one or more associations between network layer links and physical layer links. A score may be determined indicating a probability that the physical layer link comprises a failure associated with a break in a physical communication link of the physical layer link based on determining a total quantity of the network layer links associated with the physical layer link, and based on a quantity of one or more network layer links associated with the indication of the failure.

20 Claims, 15 Drawing Sheets

Alert: suspected fiber cut

Network Alert: Suspected fiber cut

Below are the alert details:

| Properties | Values | | |
|---|---|---|---|
| Optical Link | ome01.bloomfield.ct | 1-13-5<=>ome01.westfield.ma | 1-2-8 |
| Score | 0.85 | | |
| Router Links Failed | 1 | | |
| Total Router Links | 1 | | |

Associated Router Links

[tar01.chartford.ct.hartford.acme.net___HundredGigE0/14/0/t<=>sur02.westfield.ma.boston.acme.net___HundredGigE0/6/0/0]

FIG. 10

| L1 link ID (Primary index) | Popularity | Number of L3 links failed | Max S-score (g) | S-score |
|---|---|---|---|---|
| 59692ac045ed9214e9cc9934 | 4 | 3 | 0.875 | 0.656 |
| 59692ac045ed9214e9cc9936 | 3 | 1 | 0.833 | 0.278 |
| 59692ac045ed9214e9cc9938 | 5 | 5 | 0.9 | 0.9 |
| 59692ac045ed9214e9cc9935 | 1 | 1 | 0.5 | 0.5 |
| 59692ac045ed9214e9cc9937 | 1 | 1 | 0.5 | 0.5 |
| 59692ac045ed9214e9cc9939 | 1 | 0 | 0.5 | 0 |

Let k=1, alpha=0.5

SYSTEMS AND METHODS FOR DETECTING COMMUNICATION LINK BREAKS

BACKGROUND

Many conventional systems utilize solutions to detect fiber cuts that are based on fiber optic data associated with a physical layer of a network that facilitates communications based in part on usage of a multi-layered protocol. However, these conventional systems typically do not utilize data of other layers of the multi-layered protocol, such as a network layer (which may route data across a fiber). Consequently, these solutions may not be able to detect a relation between an error or failure at the network layer and a failure at the physical layer caused by the same fiber cut.

SUMMARY

Systems and methods are described for detecting one or more physical communication link breaks of a physical layer. For example, the system may determine one or more suspected physical communication link breaks, such as fiber cuts or tears, causing one or more associated physical layer failures based in part on analyzing data associated with network layer failures. The system may utilize both physical layer data and network layer data, in part, to determine a score indicating a probability that a physical layer failure(s) relates to a break in a physical communication link(s) of a physical layer. The system may also determine that, in an instance in which the score exceeds a predetermined threshold, the physical communication link is suspected to have a break. The break may be a cut or tear of one or more fibers of the physical communication link.

A method for detecting one or more physical communication link breaks of a physical layer(s) is provided. The method may comprise receiving an indication of a failure of one or more network layer links. The method may further comprise determining, based on the indication, and based on data indicating one or more associations between network layer links and physical layer links, a physical layer link associated with the one or more network layer links. The method may further comprise determining based on a total quantity of the network layer links associated with the physical layer link, and based on a quantity of the one or more network layer links associated with the indication of the failure, a score indicating a probability that the physical layer has a failure associated with a break in a physical communication link of the physical layer link.

Another method for detecting one or more physical communication link breaks of a physical layer(s) may comprise determining one or more failed network layer links associated with a physical layer link. The method may further comprise determining, based on received mapping data, a total quantity of one or more network layer links associated with the physical layer link. The method may further comprise determining based in part on the total quantity of the network layer links and a quantity of the failed network layer links, a score indicating a probability that the physical layer has a failure associated with a break in a physical communication link of the physical layer link.

Another method for detecting one or more physical communication link breaks of a physical layer(s) may comprise receiving mapping data indicating one or more network layer links associated with a physical layer link. The method may further comprise determining, based on the received mapping data, a total quantity of the network layer links associated with the physical layer link. The method may further comprise determining a score based in part on the total quantity of the network layer links and based in part on historical data associated with a quantity of one or more network layer links failures caused by a failure of a physical communication link of the physical layer link. The score may indicate a probability that the physical communication link has a break.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 10 is a diagram of an example notification of a suspected physical communication link break of a physical layer;

FIG. 11 is a diagram of an example table illustrating mapping data;

DETAILED DESCRIPTION

In an instance in which a relationship between a failure at a network layer and a failure associated with a fiber cut at a physical layer is not detected, a system may generate duplicate alarms to address these failures at the network layer and the physical layer. Generating such duplicate alarms in response to the same issue/root cause, such as a fiber cut at the physical layer, may undesirably consume computing resources (e.g., processing capacity, memory capacity, bandwidth, etc.) and may cause the system to unnecessarily allocate resources to resolve the issue(s)/failure(s). In view of these and other shortcomings, there is a need for an improved system.

Systems and methods are described for detecting one or more physical communication link breaks of a physical layer(s) of a network. For instance, the system may identify one or more suspected physical communication link breaks such as fiber cuts causing one or more associated physical layer failures based in part on analyzing data associated with network layer failures. In this regard, the system may utilize both physical layer data and network layer data in part to determine a score indicating a probability that a physical layer failure(s) relates to a break in a physical communication link(s) of a physical layer. The system may determine that in an instance in which the score exceeds a predetermined threshold, the physical communication link is suspected to have a break.

The system may also generate an alarm notifying of the suspected physical communication link break in an instance in which the score is determined to exceed the predetermined threshold. Since the system may generate an alarm associated with a physical communication link break causing a failure(s) of the physical layer that is also associated with the same failure(s) of the network layer, the system may conserve computing resources and bandwidth and may efficiently allocate network resources since the system may not need to generate duplicate alarms for the same cross-layer (e.g., physical layer, network layer) failures, unlike in conventional systems, which generate duplicate alarms and do not evaluate cross layer data for detecting fiber cuts, as described above.

Figure 1:
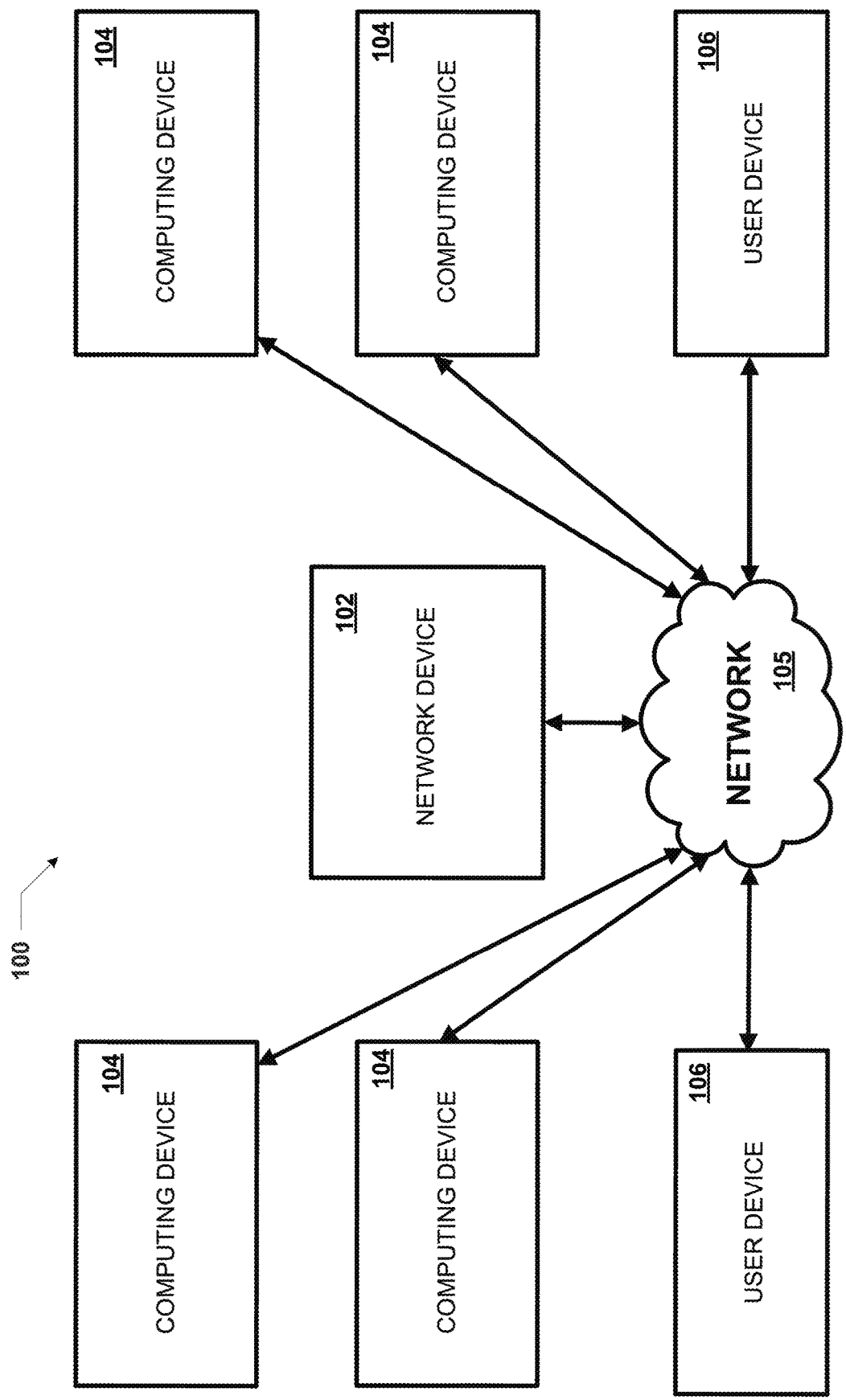
FIG. 1 is a block diagram of an example system and network.

FIG. 1 illustrates various aspects of an exemplary network in which the present methods and systems may operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 and network may comprise a network device 102, computing devices 104, and user devices 106. The network device 102, computing devices 104, and user devices 106 may be in communication with each other via a network 105 such as, for example, a private or public network (e.g., Internet). Other forms of communications can be used, such as wired and wireless telecommunication channels, for example. Although FIG. 1 shows that system 100 comprises one network device 102, four computing devices 104, and two user devices 106, the system 100 may comprise any suitable number of network devices 102, computing devices 104, and user devices 106 without departing from the spirit and scope of the invention.

Figure 2:
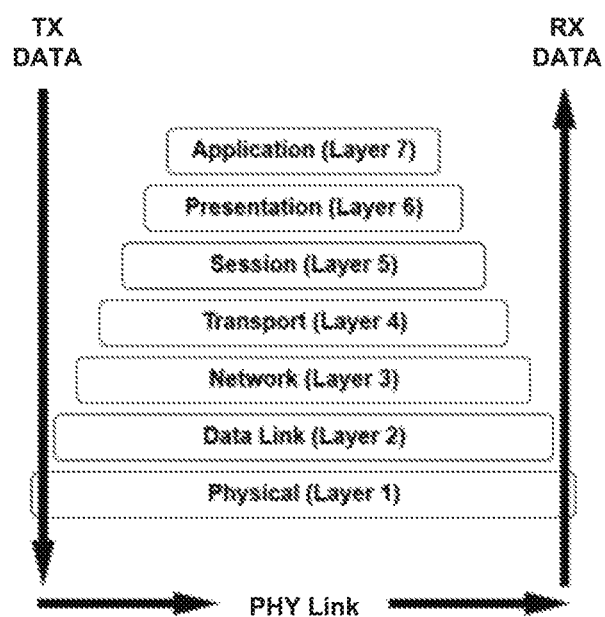
FIG. 2 is a diagram of an example layered protocol stack.

The network device 102 (e.g., a server, a gateway device, a routing device, etc.) may be configured to communicate with one or more computing devices 104 and user devices 106 and may exchange data via a network (e.g., network 105). The exchange of data may be facilitated, in part, by utilizing a layered protocol such as, for example, an Open Systems Interconnection (OSI) protocol, as shown in FIG. 2. As shown in FIG. 2, the layered protocol (e.g., OSI protocol) may comprise seven layers. These seven layers may comprise a physical layer (layer 1), a data link layer (layer 2), a network layer (layer 3), a transport layer (layer 4), a session layer (layer 5), a presentation layer (layer 6) and an application layer (layer 7). The network device 104 may communicate with other devices (e.g., computing devices 104, user devices 106) of the network (e.g., network 105), based in part on, using layers 1 to 3.

In this regard, the physical layer may be dedicated for the transmission (TX) and reception (RX) of data between communication devices (e.g., network device 102, computing devices 104 and user devices 106) and a physical transmission medium (e.g., physical (PHY) link) such as, for example, one or more fibers. The physical layer may facilitate conversion of data into electrical, radio, and/or optical signals.

The data link layer (layer 2) may provide device-to-device (e.g., node-to-node) transfer of data and may be a link between connected devices (e.g., nodes). The data link layer may also establish and terminate one or more connections between connected devices (e.g., network device 102, computing devices 104, user devices 106).

The network layer (layer 3) may facilitate the provision of data transfer (e.g., data packets) between devices across one or more networks (e.g., one or more networks 105). The network layer may route one or more packets from one network to another network (e.g., network-to-network communications). Also, each node interface (e.g., connected device(s)) to the network layer may have a network address (e.g., an Internet Protocol (IP) address).

Figure 3:
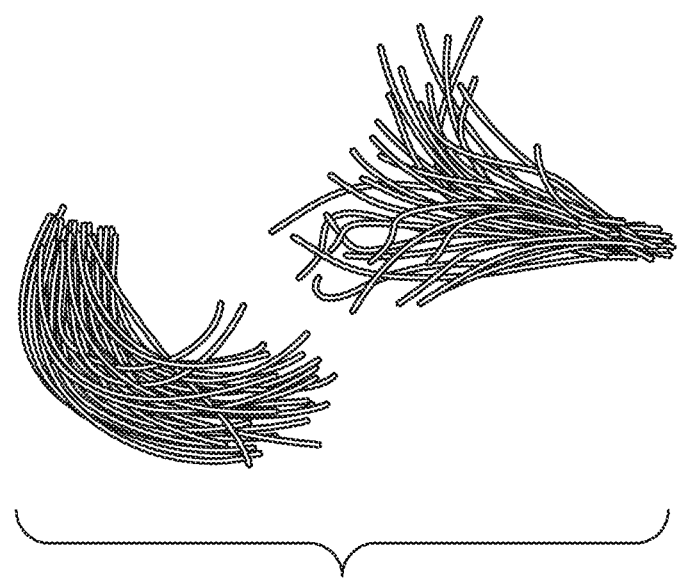
FIG. 3 is a diagram of an example physical communication link break associated with a physical layer.

In some examples, the network device 102 may analyze one or more detected layer 3 failures to determine whether the layer 3 failures are associated with layer 1 failures. In this regard, the network device may determine whether the layer 3 failures and the layer 1 failures relate to the same failures. The network device 102 may also determine whether the layer 1 failures relates to a break in a physical medium such as one or more fibers. An example of a break in one or more fibers of a physical medium or communication link associated with layer 1 is shown in FIG. 3. The network device 102 may determine whether the layer 1 failure relates to a break based in part in on determining a score indicating the probability that a layer 1 failure(s) is associated with a break in a physical medium of layer 1.

In some instances, the network device 102 may determine one or more communication devices such as, for example, computing devices 104 (e.g., network devices such as servers, gateways, switches, etc.) that may be impacted by detected layer 3 failures. In some instances, the detected layer 3 failures may impact the communication devices 104 by causing the communication devices 104 to malfunction or be non-operational (e.g., due to network outage, a link break, etc.). The network device 102 may send one or more notifications to one or more communication devices (e.g., user devices 106) indicating a failure in a communication link, as described more fully below. The failure may be caused by the communication link being down/inoperable, disconnected or malfunctioning.

Figure 4:
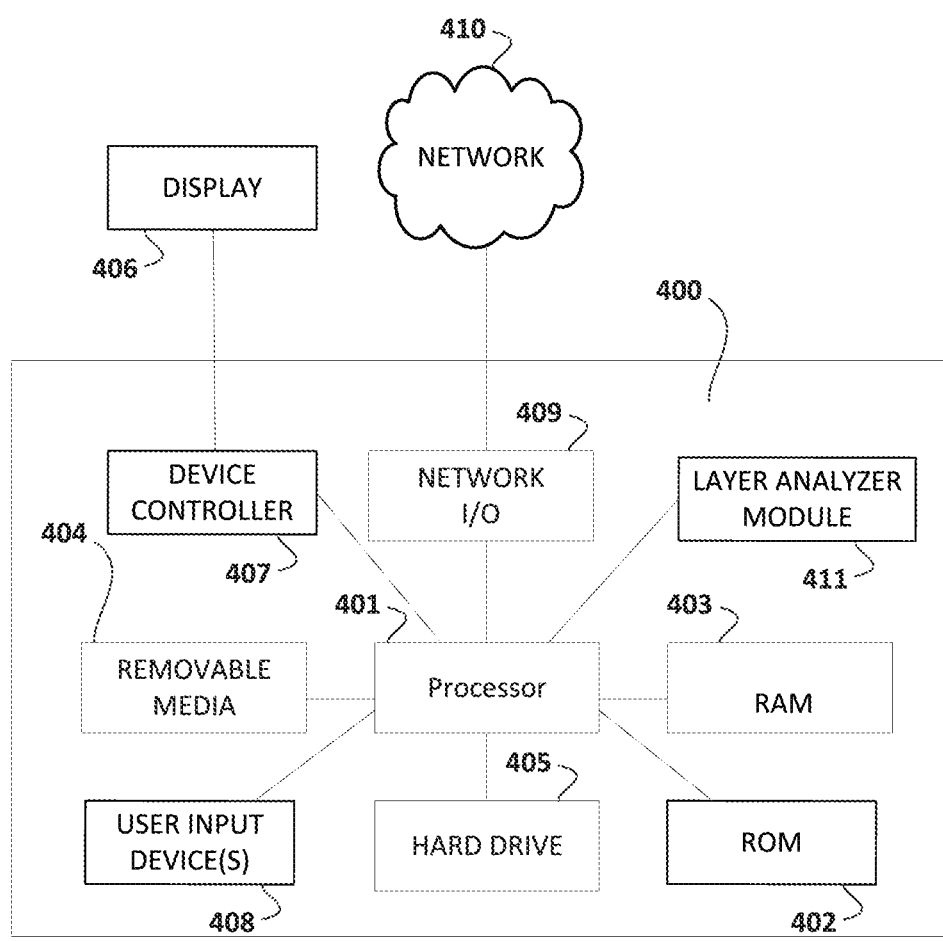
FIG. 4 is block diagram of an example device.

FIG. 4 illustrates general hardware elements of a network device 400 (e.g., network device 102 of FIG. 1). The network device 400 may comprise one or more processors 401, which may execute instructions of a computer program to perform any of the features described herein for the network device 400. The instructions may be stored in any type of computer-readable medium or memory, to configure the operation of the processor 401. For example, instructions may be stored in a read-only memory (ROM) 402, random access memory (RAM) 403, removable media 404, such as a Universal Serial Bus (USB) drive, compact disk (CD) or digital versatile disk (DVD), floppy disk drive, or any other desired electronic storage medium. Instructions may also be stored in an attached (or internal) hard drive 405. The network device 400 may comprise or be in communication with one or more output devices, such as a display 406 (or an external television) and may comprise one or more output device controllers 407 (also referred to herein as device controller 407), such as a video processor. There may also be one or more user input devices 408, such as a remote control, keyboard, mouse, touch screen, microphone, etc. The network device 400 may also comprise one or more network interfaces, such as network input/output (I/O) circuits 409 (also referred to herein as network input/output 409 (e.g., a network card) to communicate with an external network (e.g., network 410 (e.g., network 105)). The network interface(s) may be a wired interface, wireless interface, or a combination of the two. In some examples, the network interface(s) such as, for example, network I/O circuits 409 may comprise a modem (e.g., a cable modem). The network 410 may comprise an external network, an in-home network, a provider's wireless network, coaxial, fiber, or hybrid fiber/coaxial distribution system (e.g., a Data Over Cable Service Interface Specification (DOCSIS) network), or any other desired network.

The processor 401 may be in communication with and may otherwise control a layer analyzer module 411. The layer analyzer module 411 may be any means such as a device or circuitry operating in accordance with software or otherwise embodied in hardware or a combination of hardware and software thereby configuring the device or circuitry (e.g., a processor, controller, microprocessor or the like) to perform the corresponding functions of the layer analyzer module 411, as described below. In examples in which software is employed, a device or circuitry (e.g., processor 401 in one example) executing the software may form the structure associated with such means. The layer analyzer module 411 may be configured to, among other things, determine one or more layer 3 failures and determine whether the layer 3 failures correspond to the same layer 1 failures. The layer analyzer 411 may determine whether the layer 1 failures are associated with a break in a communication link such as one or more fibers of a physical medium associated with layer 1, as described more fully below.

The FIG. 4 example is an example hardware configuration. Modifications may be made to add, remove, combine, divide, etc. components as desired. Additionally, the components illustrated may be implemented using basic computing devices and components, and the same components (e.g., processor 401, ROM 402, user input device(s) 408, etc.) may be used to implement any of the other computing devices and components described herein. For example, the various components herein may be implemented using computing devices having components such as a processor executing computer-executable instructions stored on a computer-readable medium, as illustrated in FIG. 4.

Some examples described herein may be embodied in computer-usable data and/or computer-executable instructions, such as in one or more program modules, executed by one or more computers or other devices. Generally, program modules comprise routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Figure 5:
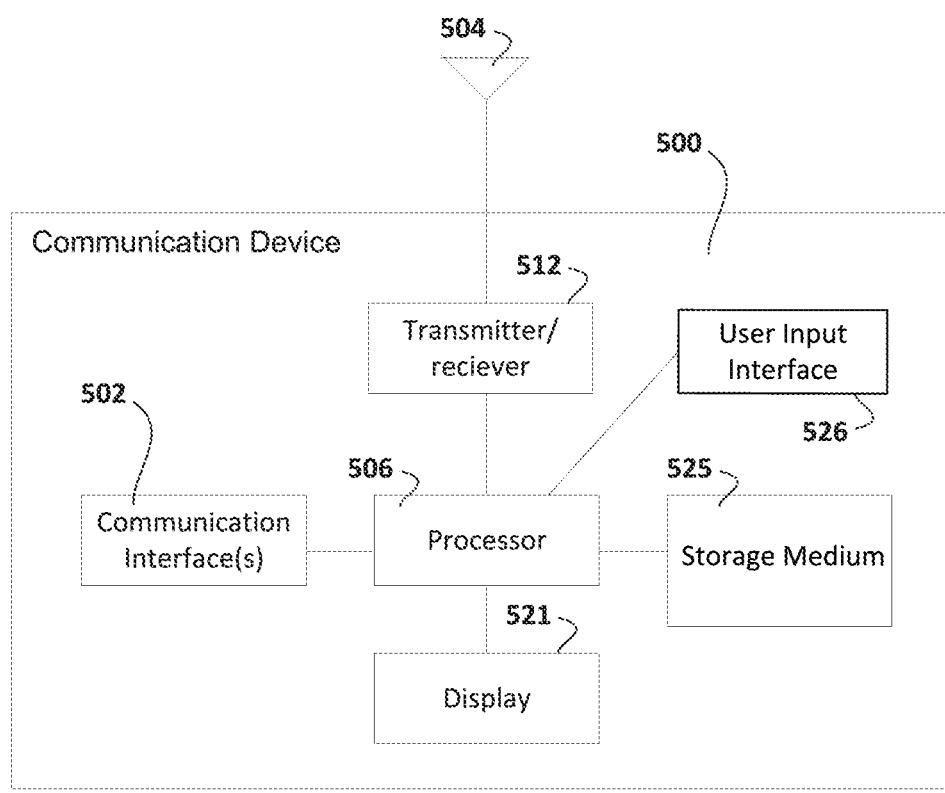
FIG. 5 is a block diagram of an example communication device.

FIG. 5 illustrates an example of a communication device 500 that can be used to implement any of the various computing devices 104 and user devices 106 discussed herein. In some examples, one or more components of the network device in FIG. 4 may be used in the communication device in FIG. 5. Additionally, in some examples, components of the communication device of FIG. 5 may be used in the network device in FIG. 4. The communication device 500 may be a communications terminal (e.g., a server, a mobile device, a computer, a smart phone, a smart tablet, a laptop or any other suitable computing device). The communication device 500 comprises an antenna 504 that is adapted to receive and transmit signals in cooperation with a transmitter/receiver unit 512. The antenna 504 and the transmitter/receiver unit 512 may also receive content from another device (e.g., network device 102, etc.).

The processor 506 may be connected to a storage medium 525. The storage medium 525 may comprise volatile and/or non-volatile memory, and may store instructions, applications, algorithms or the like for execution by the processor 506. The storage medium 525 may be a non-transitory computer-readable medium storing instructions that, when executed by the processor 506, causes the communication device 500 to perform steps described herein. The storage medium 525 may also store content transmitted from, and/or received by, other communication devices (e.g., network devices 102, etc.). In this regard, the storage medium may store data received from disparate sources.

The processor 506 may also be connected to at least one interface or other means for displaying, transmitting and/or receiving data, content or the like. The interface(s) may comprise at least one communication interface 502 or other means for transmitting and/or receiving data, content or the like. The communication interface 502 may comprise, for example an antenna and supporting hardware and/or software for enabling communications with a wireless communication network. For example, the communication interface(s) may comprise a first communication interface for connecting to a first network, and a second communication interface for connecting to a second network. In this regard, the communication device 500 is capable of communicating with other communication devices (e.g., network devices 102, etc.) over one or more networks (e.g., network 105) such as, for example, a Wide Area Network (WAN), Wireless Wide Area Network (WWAN), the Internet, a Local Area Network (LAN) wireless LAN (WLAN), or the like. Alternatively, the communication interface may support a wired connection with the respective network.

In addition to the communication interface(s), the interface(s) may also comprise at least one user interface that may comprise one or more earphones and/or speakers, a display 521, and or a user input interface 526. The user input interface, in turn, may comprise any of a number of devices allowing the communication device 500 to receive data from a user, such as a microphone, a keypad, keyboard, a touch display, a joystick, image capture device, pointing device (e.g., mouse), stylus or other input device.

Figure 6:
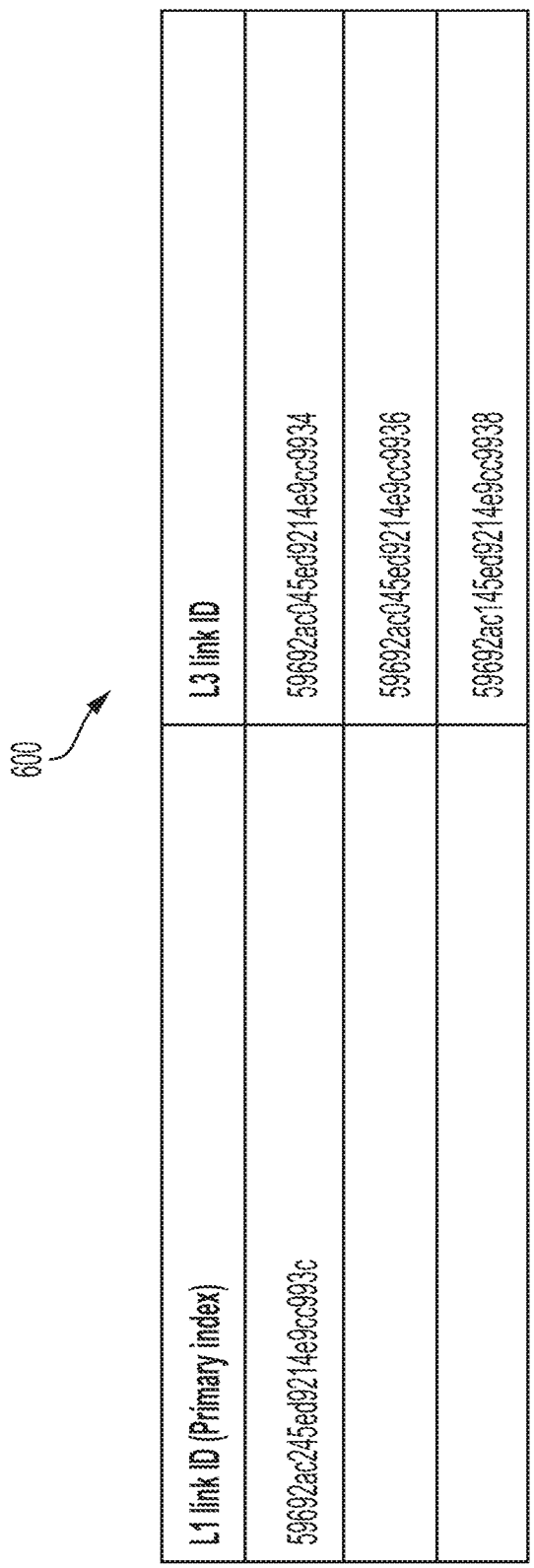
FIG. 6 is a diagram of an example table illustrating mapping data.

In some examples, the layer analyzer module 411 may detect and analyze layer 3 (also referred to herein as L3) data and layer 1 (also referred to herein as L1) data and may determine one or more mapping relationships between data of layer 3 and layer 1. As an example, as shown in the layer 1-to-layer 3 (L1-to-L3) mapping data in table 600 of FIG. 6, the layer analyzer module 411 may determine that a layer 1 link associated with L1 link ID 59692ac245ed9214e9cc993c has three layer 3 links associated with L3 link IDs 59692ac045ed9214edcc9934, 59692ac045ed9214e9cc9936, 59692ac145ed9214e9cc9938 on the communication path of the layer 1 link.

Figure 7B:
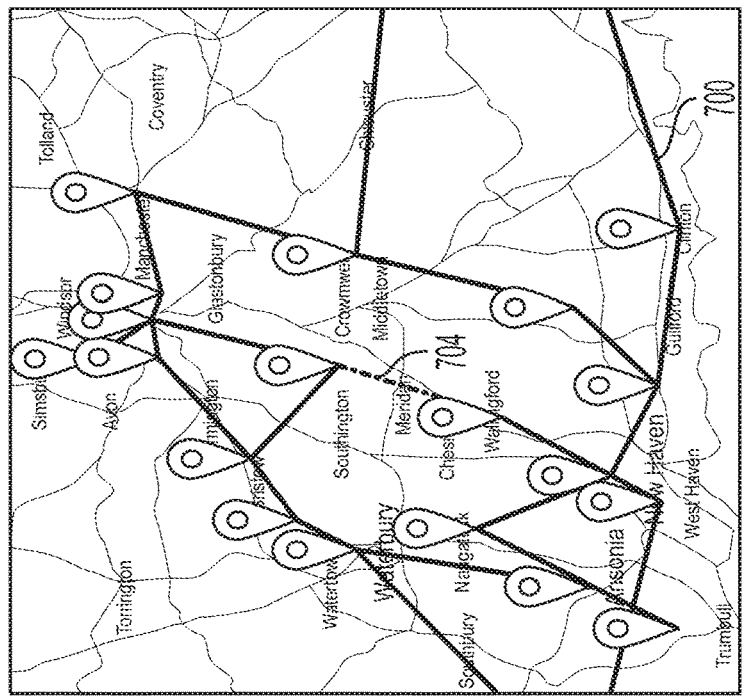
FIGS. 7A and 7B are diagrams of examples illustrating one or more physical layer links and network layer links.
Figure 7A:
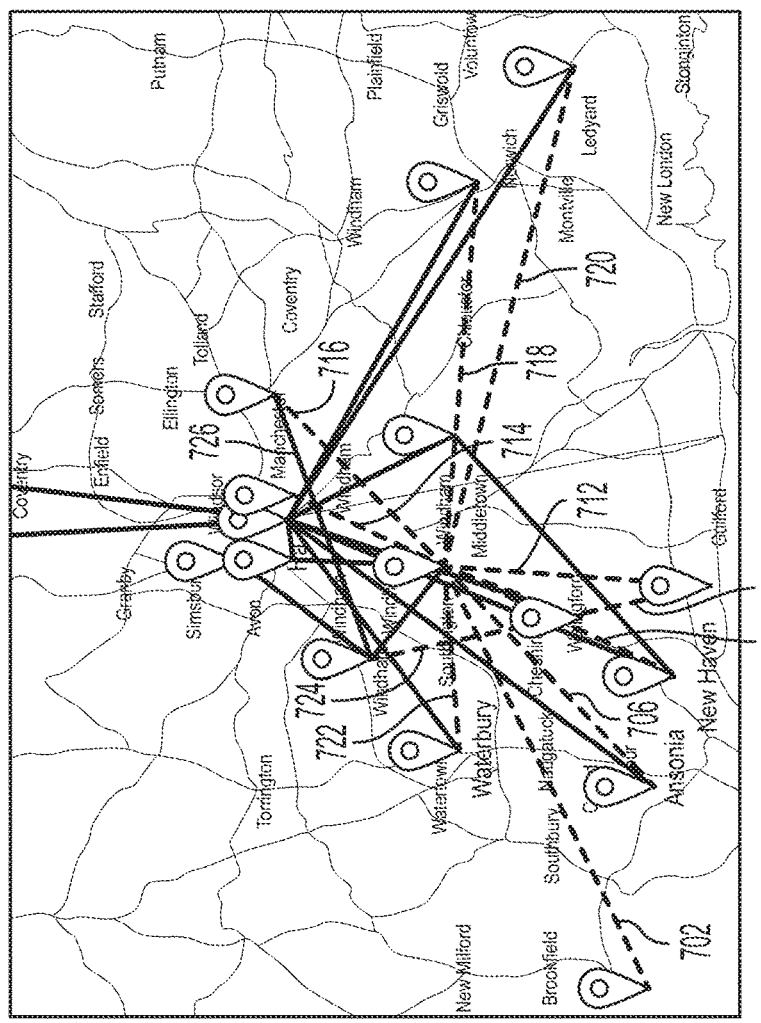

FIGS. 7A and 7B are side-by-side views indicating layer 3 links that are associated with a layer 1 link for a geographic area. In the examples of FIGS. 7A and 7B, the layer analyzer module 411 may analyze layer 1 and layer 3 data and may determine that several layer 3 links such as, for example, layer 3 links 702, 706, 708, 710, 712, 714, 716, 718, 720, 722, 724 are on the same communication path as layer 1 link 704. For example, FIG. 7A indicates the layer 3 links 702, 706, 708, 710, 712, 714, 716, 718, 720, 722, 724 that are associated with the layer 1 link 704 in FIG. 7B. The layer 3 links 702, 706, 708, 710, 712, 714, 716, 718, 720, 722, 724 may utilize a physical communication interface of the layer 1 link 704 to communicate data (e.g., data packets) between network nodes (e.g., network devices). In this regard, the layer 3 links 702, 706, 708, 710, 712, 714, 716, 718, 720, 722, 724 may be associated with the layer 1 link 704. In some examples, layer 1 link 704 may be an optical link. The layer analyzer module 411 may determine that there is a high level of layer 3 connectivity on the layer 1 link 704 since the layer 1 link 704 is involved in the path of many associated L3 links denoting a high popularity L1 link. In some examples, a number of L3 links, on a same communication path as a layer 1 link, that exceeds a predetermined threshold (e.g., more than 5 L3 links, etc.) may be determined as a high popularity L1 link. FIG. 7A also shows other layer 3 links (e.g., layer 3 link 726) of the geographic area that may not be associated with the layer 1 link 704 of FIG. 7B. The other layer 3 links may instead be associated with one or more other layer 1 links (e.g., layer 1 link 700) in FIG. 7B.

Figure 8B:
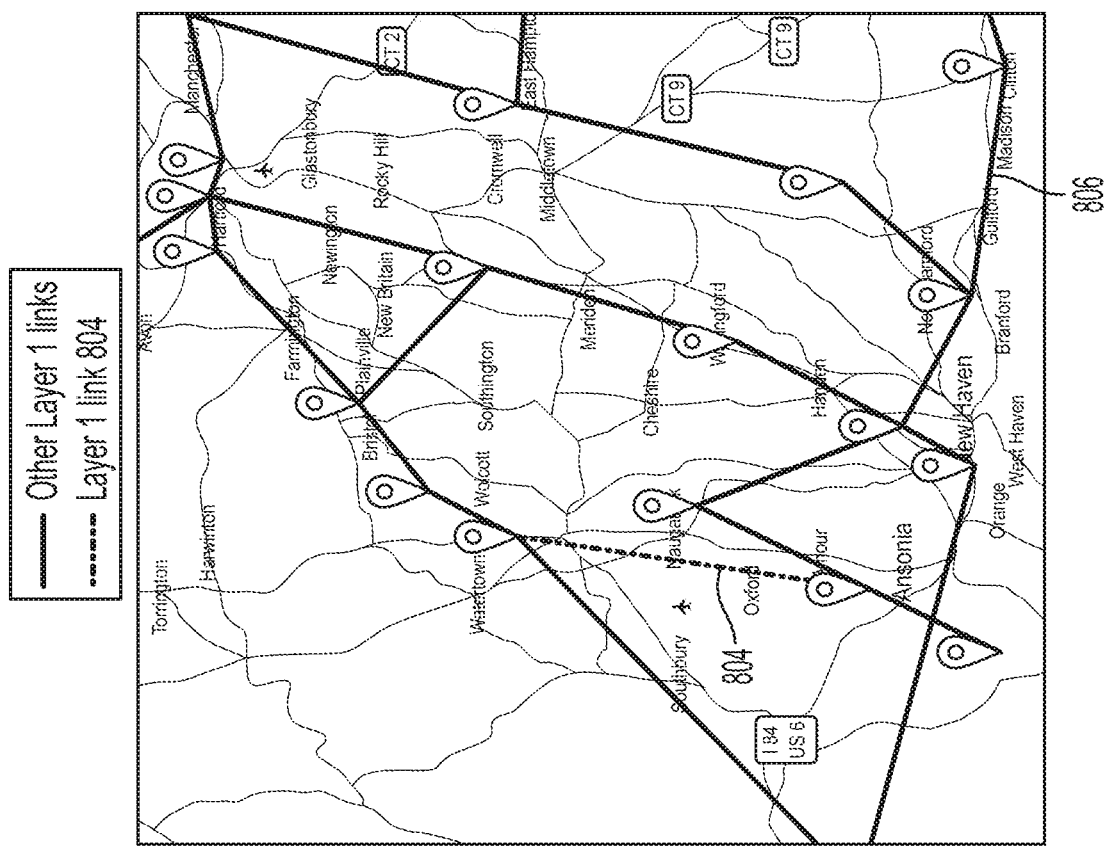
FIGS. 8A and 8B are diagrams of examples illustrating one or more physical layer links and network layer links.
Figure 8A:
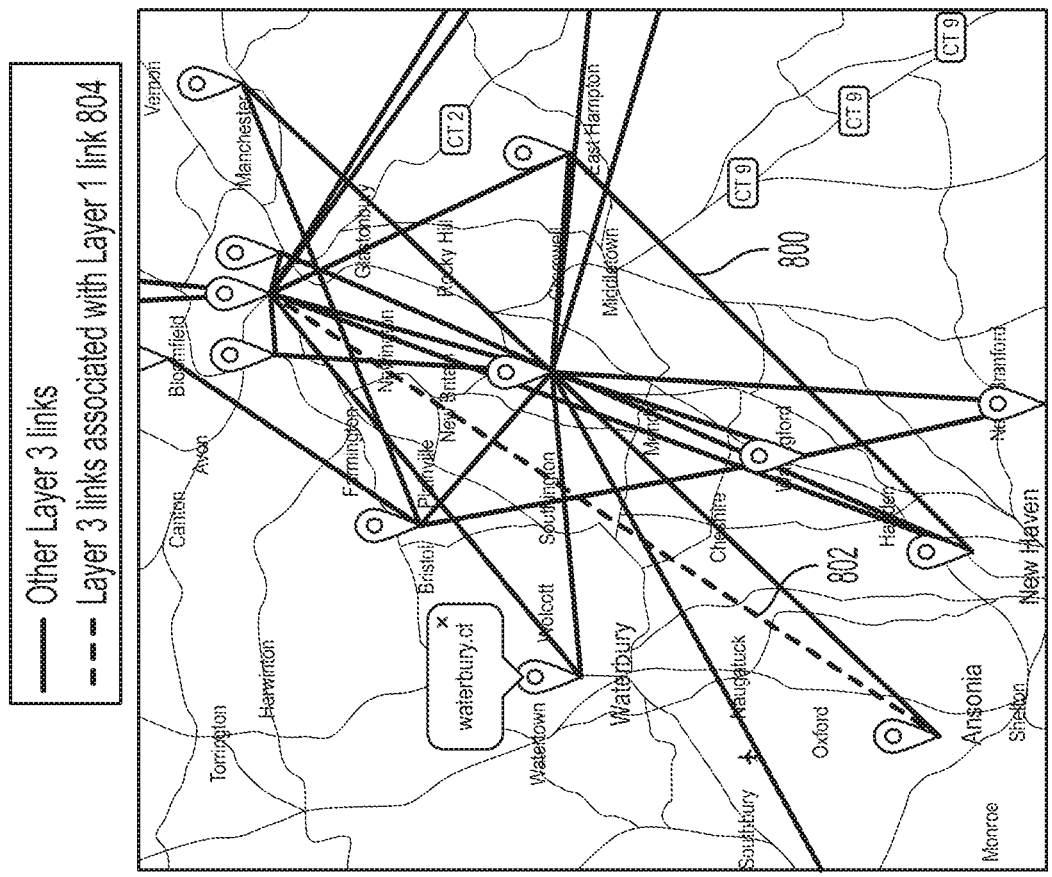

FIGS. 8A and 8B are side-by-side views indicating a layer 3 link that is associated with a layer 1 link for a geographic area. For example, FIG. 8A indicates the layer 3 link 802 is associated with the layer 1 link 804 in FIG. 8B. The layer 3 link 802 may utilize a physical communication interface of the layer 1 link 804 to communicate data (e.g., data packets) between network nodes (e.g., network devices). In this regard, the layer 3 link 802 may be associated with the layer 1 link 804. FIG. 8A and FIG. 8B may show that the layer analyzer module 411 may determine that a few layer 3 links such as, for example, layer 3 link 802 is on a same communication path as layer 1 link 804. In some examples, layer 1 link 804 may be an optical link. The layer analyzer module 411 may determine that the layer 1 link 804 is involved in the path of a few L3 links (one layer 1 link 804 in this example) and may determine that layer 1 link 804 is a low popularity L1 link. In some examples, a number of L3 links, on a same communication path as a layer 1 link, that is below a predetermined threshold (e.g., below 3 L3 links, etc.) may be determined as a low popularity L1 link. FIG. 8A also shows other layer 3 links (e.g., layer 3 link 800) of the geographic area that may not be associated with the layer 1 link 804 of FIG. 8B. The other layer 3 links may instead be associated with one or more other layer 1 links (e.g., layer 1 link 806) in FIG. 8B.

The layer analyzer module 411 may analyze layer 3 interface link status telemetry data and utilize layer 1-to-layer 3 mapping data (e.g., the mapping data in table 600 of FIG. 6) that may be collected from one or more layer 3 and layer 1 links of a network (e.g., network 105) to determine communication link breaks. The layer 3 interface link status telemetry data may indicate a number of failed layer 3 links. A popularity level of each layer 1 link may be defined as the number of layer 3 links whose path involves the corresponding layer 1 link. Based on a popularity level of each layer 1 link and based on the number of failed layer 3 links currently reported in the link status telemetry data, the layer analyzer module 411 may generate an algorithm to determine a score (e.g., a suspicious score, also referred to herein as S score) of each layer 1 segment of a network (e.g., network 105) having a communication link break by determining the following:

$$S_{\alpha,k}(x,N) = g_{\alpha,k}(N) * x/N = (1-(1-\alpha/N^k)) * x/N$$

where N denotes the number of total layer 3 links that are associated with a layer 1 link (i.e., having the layer 1 segment in the optical path of the layer 3 links); x denotes the number of failed layer 3 links that have the layer segment in its optical path; k denotes a parameter that controls how fast the score value increases with N; and a is the prior probability that reflects the overall probability that a layer 3 link failure is caused by a layer 1 link failure. Additionally, a equals to the ratio of the number of layer 3 failures caused by a layer 1 failure(s) over the number of layer 3 link failure(s) in total. The prior probability a may be calculated based in part on historical data. For example, each time the layer analyzer module 411 detects a suspected fiber cut event such as a communication link break/tear through layer 3 link failures when the layer 3 link failure(s) issues are investigated, feedback data may be fed back to the layer analyzer module 411. The feedback data may be utilized by the layer analyzer module 411 to update a prior probability a value, which may increase the accuracy of a over time. In some examples, the historical data obtained over time to update a may correspond to a number of layer 3 link failures (e.g., 700) caused by a layer 1 failure divided by a total number of layer 3 link failures (e.g., 3,000) the output (e.g., 700/3000=0.23) of which may be fed back to the layer analyzer module 411 as an updated α value.

The $g_{\alpha,k}(N)$ represents the maximum score for a layer 1 link based on the number of layer 3 links associated with the layer 1 link i.e., N, where $g_{\alpha,k}(N)=1-(1-\alpha/N^k)$. In an instance in which N=1, $g_{\alpha,k}(x, N)$ equals to the prior probability. As such, in an instance in which there is only one layer 3 link associated with a layer 1 link, there may be no additional information to deduce from the layer 1-to-layer 3 mapping topology data. Thus, the probability of having a fiber cut equals to the probability that a layer 3 link failure is generally caused by a fiber cut based on analyzing historical data of prior layer 3 link failures. By analyzing the historical data, a communication device such as network device 102 may determine the overall probability or rate that layer 3 link failures are related to or caused by a fiber cut, as opposed to other root causes such as, for example, router device failures, etc. In this regard, in some instances in which N=1, the probability that a layer 3 link failure(s) is caused by a fiber cut may be low. For example, in an instance in which there are few layer 3 links on a path of a layer 1 link, the popularity of the layer 1 link may be low as described above with respect to FIGS. 8A and 8B, and as such there may be a lower probability that the root cause of the layer 3 link failures is due to a communication link break associated with the layer 1 link. On the other hand, in an instance in which there are many layer 3 links on a path of a layer 1 link, the popularity of the layer 1 link may be high as described above with respect to FIGS. 7A and 7B, and as such there may be a higher probability that the root cause of the layer 3 link failures is due to a communication link break associated with the layer 1 link.

FIGS. 8A and 8B illustrate an example in which N=1 since there is one layer 3 link 802 with a failure on a communication path of a layer 1 link 804. In this regard, the failure associated with the layer 3 link 802 may be due to factors other than a communication link break. The probability that the failure relates to a communication link break is lower when there is a one-to-one mapping of the layer 3 link to the layer 1 link as in the example of FIGS. 8A and 8B.

The score $S_{\alpha,k}(x, N)$ may indicate that the likelihood of a communication link break increases with the number of layer 3 link failures, i.e. x, and reaches a maximum score in an instance in which all the layer 3 links associated with a layer 1 link failed, i.e. x=N. Referring back to FIGS. 7A and 7B, an example of x=N may be in an instance in which all of the layer 3 links such as, for example, layer 3 links 702, 706, 708, 710, 712, 714, 718, 720, 722, 724 have link failures on a same communication path of a layer 1 link such as, for example, layer 1 link 704.

Figure 9:
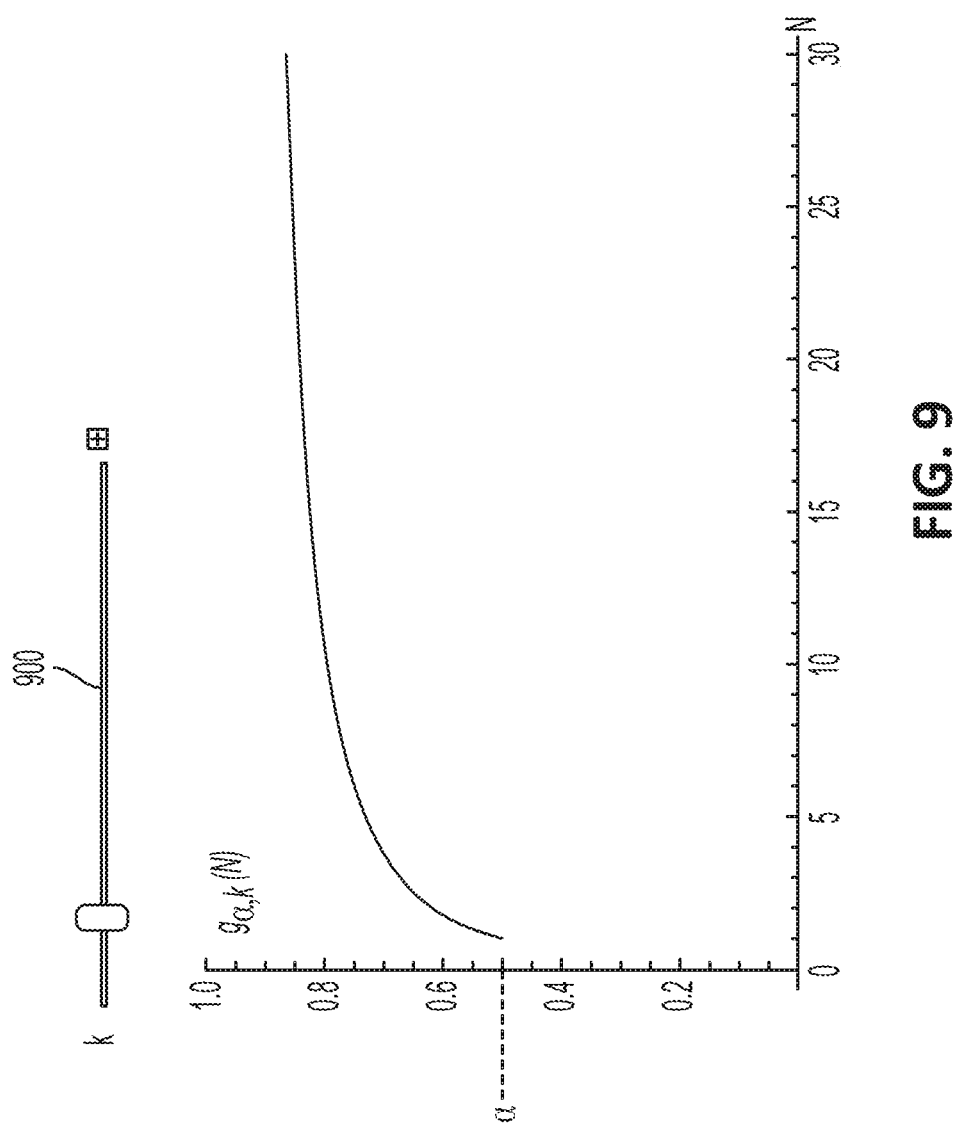
FIG. 9 is a diagram of an example graphically illustrating scores associated with a physical layer link.

As shown in FIG. 9, as the value of N increases, which may denote a high popularity link such as a layer 1 link having many layer 3 links on its path, the maximum score $g_{\alpha,k}(x, N)$ for a layer 1 link such as, for example, layer 1 link 704 may increase.

In an instance in which the layer analyzer module 411 determines a score (e.g., an S score) exceeds a predetermined threshold, the layer analyzer module 411 may cause/trigger output of an alarm denoting a suspected communication link break associated with a layer 1 link. In some examples, a score may, but need not, be a value/number between 0 and 1. In other examples, a score may be any other suitable value(s). The predetermined threshold may be 80% in some examples. In other examples, the predetermined threshold may be any other suitable threshold value such as, for example, 75%, 85%, etc.

As an example, in an instance in which the layer analyzer module 411 determines that a S score equals 0.85 denoting a probability of 85% (e.g., 0.85*100=85%) that a layer 1 link segment has a communication link break, the layer analyzer module 411 may cause output of an alarm to indicate the suspected communication link break. In some examples, the layer analyzer module 411 may cause output of the alarm by generating a notification (e.g., an electronic notification) that may be sent to a communication device (e.g., computing device 104, user device 106). An example of such a notification, generated and output by the layer analyzer module 411, is shown in FIG. 10. In the example of FIG. 10, the notification 1000 may indicate a suspected fiber cut/tear associated with a layer 1 link such as an optical link. The notification 1000 may also comprise an indication of a score (e.g., 0.85) and a number of router links (e.g., 1 router link in FIG. 10) that failed as well as an indication of the associated router link(s) such as, for example, a layer 3 link router. In some examples, the notification may comprise an indication of the communication link suspected as having the break. In some examples, in addition to generating the notification 1000, the layer analyzer module 411 may call (e.g., a telephone call) or message (e.g., a short message service (SMS) message) one or more communication devices (e.g., computing devices 104, user devices 106) indicating the details of the notification 1100.

Based on a communication device (e.g., computing device 104, user device 106) receiving the notification 1000 and/or call/message from the layer analyzer module 411, the layer 1 link suspected of having a failure may be evaluated and troubleshooted to verify whether the layer 1 link has a fiber cut/break. In an instance in which the evaluation indicates that the layer 1 link does not have a fiber cut/break, the layer analyzer module 411 may reset the score (e.g., reset the value of the score to 0). In some examples, the evaluation as to whether the layer 1 link suspected as having a fiber cut may be verified by one or more network technicians. For example, the verification may be based in part on a technician inspecting a portion of the layer 1 link suspected as having the fiber cut.

In some other examples, in an instance in which the layer analyzer module 411 determines a score is below the predetermined threshold (e.g., 85%, 80%, etc.), the layer analyzer module 411 may determine that the layer 1 link is unlikely to have a break. In yet other examples, in an instance in which the layer analyzer module 411 determines a score is below the predetermined threshold, the layer analyzer module 411 may determine that one or more failed layer 3 links are caused by an event other than a break in the layer 1 link.

The following is an example scenario of the layer analyzer module 411 determining a score $S_{\alpha,k}(x, N)=g_{\alpha,k}(N)*x/N=(1-(1-\alpha/N^k))*x/N$ associated with a layer 1 link. For the purposes of this example, it will be assumed that there are five layer 3 link (e.g., layer 3 links 702, 706, 708, 710, 712) connections with a path that includes the same layer 1 link (e.g., layer 1 link 704) segment. For the layer 1 link segment, the layer analyzer module 411 may determine the score which indicates how likely there is a communication link break on the layer 1 link segment (e.g., layer 1 link 704). In this example, N=5 since there are five layer 3 link connections on the path of the layer 1 link segment. Suppose further that a network monitoring system (e.g., network device 102, computing device 104) detects that two (e.g., layer 3 links 702, 706) of the five layer 3 link connections are down/inoperable (e.g., failing, disconnected). In this scenario, x=2 in the above-referenced formula. The prior probability value a may initially be set to 0.5 and may be adjusted, by the link analyzer module 411, over time based on feedback, as described above. As pointed out above, k is a parameter that controls how fast the score value increases with N. The parameter k may be used to rescale a final score(s) and ensure that the score(s) reflects a probability that makes sense to users. As shown in FIG. 9, the parameter k may be adjusted, for example, via a slider 900 which may affect a final score. While the parameter k may be adjusted based on user feedback, via slider 900, the layer analyzer module 411 may initially set the parameter k to 1 in this example. The layer analyzer module 411 may determine the S score=(1-(1-0.5)/5)*2/5=0.9*0.4=0.36, denoting that in an instance in which two out of the five layer 3 link connections are reported as down/inoperable, the layer analyzer module 411 may determine a probability of 36% that the layer 1 link (e.g., layer 1 link 704) segment has a communication link break. As another example, consider an instance in which all five layer 3 link connections are down (e.g., x=5). The layer analyzer module 411 may determine the S score equals 0.90 (e.g., (1-(1-0.5)/5)*5/5=0.9*1=0.90) which the layer analyzer module 411 may determine as a probability of 90% (e.g., 0.90*100=90%) indicating a high chance that the suspected layer 1 link (e.g., layer 1 link 704) segment has a communication link break. In this example, x=N denoting a maximum S score since all five layer 3 link connections are associated with the layer 1 link (e.g., layer 1 link 704) segment.

Suppose further that after some predetermined time period (e.g., after 3 months), the layer analyzer module 411 detects 2,000 incidents of layer 3 link connection failures and determines that among the 2,000 incidents there are 500 incidents resulting from communication link breaks. The layer analyzer module 411 may use this incident information as feedback data and may adjust a to be 0.25 (e.g., 500/2000=0.25) since a may be obtained by historical/empirical data over a time period in which a number of layer 3 link failures caused by a layer 1 failure are divided by a total number of layer 3 link failures.

As another example, consider the layer 1 to layer 3 mapping data of FIG. 11 in table 1100. The mapping data of table 1100 may indicate a number of failed layer 3 links that are associated with a layer 1 link. For example, row 1 of table 1100 indicates three failed layer 3 links associated with a layer 1 link having a L1 link ID of 59692ac045ed9214e9cc9934. FIG. 11 also shows the popularity levels of layer 3 links in which the popularity level corresponds to N, described above, which denotes the number of total layer 3 links associated with a layer 1 link. For example, at row 1 of table 1100, the popularity level denotes that there are four layer 3 links (e.g., N=4) associated with the layer 1 link having L1 link ID of 59692ac045ed9214e9cc9934. In the example of FIG. 11, the layer analyzer module 411 may determine corresponding S scores and maximum scores (also referred to herein as max S-scores) as shown in table 1100. As an example of the layer analyzer module 411 determining an S-score, consider row 1 of the table 1100 indicating the total number of layer 3 links that are associated with a layer 1 link in its path is four (e.g., N=4, denoting the popularity level). The number of failed layer 3 links detected on the same path as the layer 1 link (having L1 link ID of 59692ac045ed9214e9cc9934) may be three (e.g., x=3). Presume that α equals 0.5 and k equals 1. The layer analyzer module 411 may determine the S score=(1−(1−0.5)/4)*3/4=0.9*0.4=0.656 as indicated in row 1 of table 1100. In this example, the layer analyzer module 411 may also determine that the maximum S score is 0.875 (e.g., (1−(1−0.5)/4))=0.875) as indicated in row 1 of table 1100. As described above, $g_{\alpha,k}(N)$ represents the maximum S score for a layer 1 link based on the number of layer 3 links associated with the layer 1 link, where $g_{\alpha,k}(N)=1-(1-\alpha/N^k)$. In some examples, the layer analyzer module 411 may analyze maximum S scores relative to associated S scores. For example, in an instance in which the layer analyzer module 411 determines that the value of an S score (e.g., 0.656) is close (e.g., within a predetermined threshold) to an associated maximum S score (e.g., 0.875), the layer analyzer module 411 may determine that the probability is high that there is a break (e.g., a cut/tear of one or more fibers) in the layer 1 link. On the other hand, in an instance in which the layer analyzer module 411 determines the value (e.g., 0.278) of an S score is low relative to an associated maximum S score (e.g., 0.833), the layer analyzer module 411 may determine that the probability is low that there is a break in the layer 1 link. Other S scores and maximum S scores indicated in the table 1100 may be determined by the layer analyzer module 411 in a similar manner as described above.

The layer analyzer module 411 may determine whether there are layer 3 link-down events such as non-operational layer 3 links caused by, for example, device maintenance activities identified and stored in a database of a memory device (e.g., hard drive 405, RAM 403)) for real-time maintenance activities, as well as device down/network outage situations where layer 3 link downs may have known alternative root cause failures. Some examples of known alternative root cause failures may be module/linecard failures of router devices, non-operational or malfunctioning devices caused by a power outage, overheating, etc. In some examples, a communication device (e.g., network device 102) may provide a user interface for users such as, for example, network engineers to input data indicating the scheduled maintenance time window(s) for performing maintenance on one or more network devices (e.g., computing devices 104) and/or layer 3 links.

Even when the link analyzer module 411 may be aware of a layer 3 link-down event(s) (e.g., based on analyzing information (e.g., a maintenance activity schedule) in a database of a memory for example, due to scheduled maintenance of a layer 3 link and/or network device being down etc., the layer analyzer module 411 may still determine a score for the layer 1 link on the path of the layer 3 link that is down to determine the probability that the layer 1 link has a communication link break.

In some examples, a communication device (e.g., network device 102) may analyze telemetry data associated with a network layer of a network (e.g., network 105). The telemetry data may be associated with network layer status telemetry data and the network layer may be a layer 3 link. The communication device may receive the telemetry data in one or more messages such as, for example, system log messages from one or more network servers that monitor communication links (e.g., interfaces). In this regard, in an instance in which a communication link(s) fails, a network server may create a record of the failure and include the record in a message(s) that may be sent to the communication device. The communication device may be able to determine a number of failed L3 links based on the telemetry data in the message(s).

Figure 12:
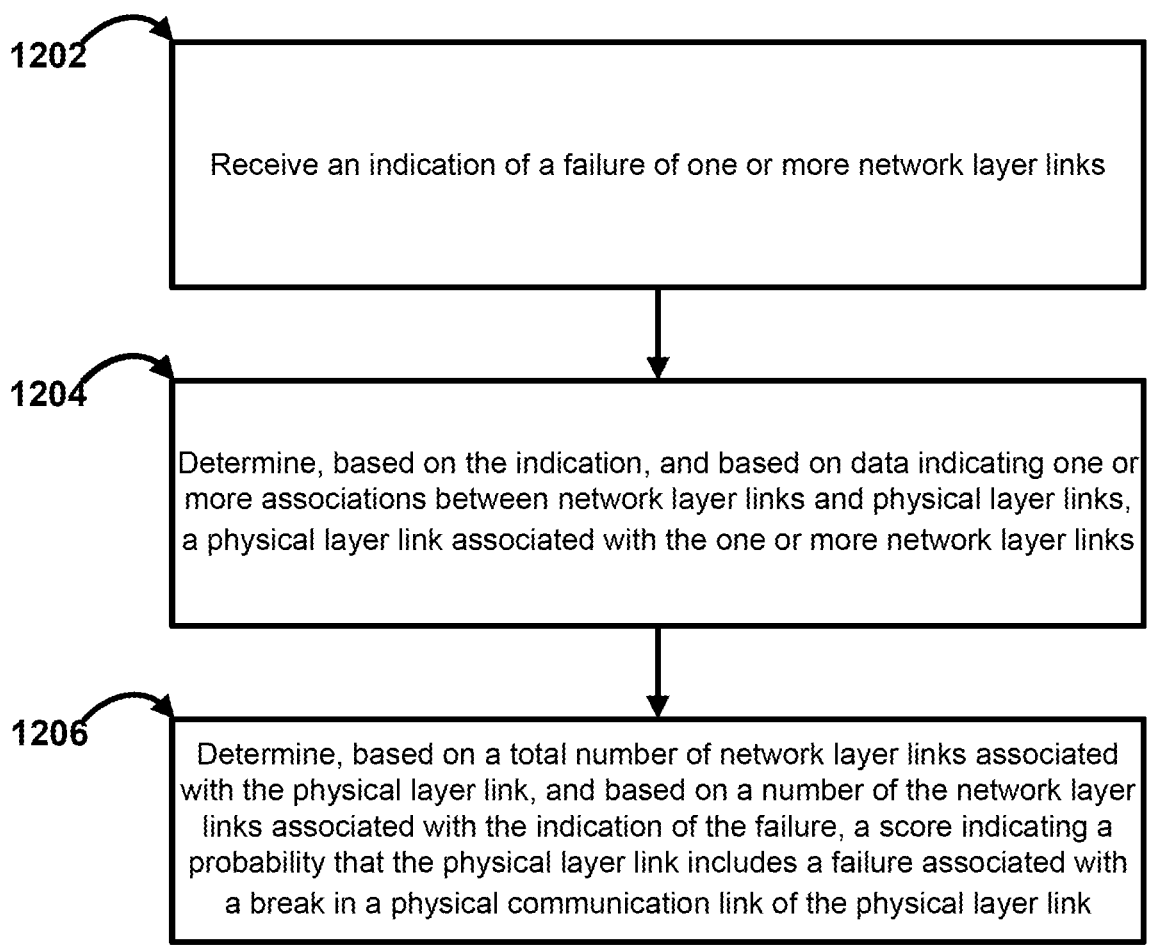
FIG. 12 is a flow chart of an example method.

FIG. 12 illustrates an example method for detecting one or more physical communication link breaks of a physical layer(s). At operation 1202, a communication device (e.g., network device 102) may receive an indication of a failure of one or more network layer links. In some examples, the indication of the failure of one or more network layer links may be sent by a network server to the communication device in a message(s), in the manner described above. At operation 1204, the communication device may determine, based on the indication, and based on data (e.g., mapping data) indicating one or more associations between network layer links and physical layer links, a physical layer link (also referred to herein as physical communication layer links) associated with the one or more network layer links. An example of the data may be the mapping data of table 600 or the mapping data of table 1100. In some examples, the network layer links may be layer 3 links 702, 706, 708, 710, etc. and the physical layer link may be a layer 1 link. In other examples one or more network servers may collect or obtain the mapping data by monitoring data from layer L1 devices and layer L3 devices associated with communication links.

At operation 1204, the communication device may determine, based on a total number/quantity of the network layer links associated with the physical layer link, and based on a number/quantity of the one or more network layer links associated with the indication of the failure, a score indicating a probability that the physical layer link comprises a failure associated with a break in a physical communication link of the physical layer link. As an example, the total number/quantity of the network layer links such as layer 3 links may be four, as shown at row 1 in FIG. 11. (See e.g., Popularity 4 at row 1 of FIG. 11). The communication device may determine, based on received telemetry data, the number/quantity of failed network layer links among the total number of network layer links. As an example, the number of failed network layer links (e.g., L3 links) may be three among a total number (e.g., 4) of network layer links, as shown in FIG. 11. In one example, the physical communication link may be a physical transmission medium (e.g., one or more fibers) of layer 1 link 704 and the score may be a S score such as, for example, 0.656 as shown in FIG. 11. The break may comprise a cut(s)/tear(s) of one or more fibers in the physical communication link of the physical layer. In some examples, a communication device (e.g., network device 102) may also determine that the failed network layer links are suspected as being associated with, or caused by, the break in the physical communication link based in part on determining that the score exceeds a predetermined threshold (e.g., 80%, 85%, etc.). Also, in some examples a communication device (e.g., network device 102) may evaluate and utilize historical/empirical data in determining the score. The historical/empirical data may be associated with and/or indicate a quantity/number of network layer link failures (e.g., layer 3 link failures) caused by a failure of a physical layer (e.g., a failure of the physical communication link of the physical layer (e.g., layer 1)) divided by a total number/quantity of network layer link failures during a time period. This historical/empirical information may be used by the layer analyzer module 411 of a communication device (e.g., network device 102) to update the prior probability a, as described above.

The network layer such as layer 3 and the physical layer such as layer 1 may be part of a protocol stack including a priority of layers (e.g., layer 1 through layer 7 of FIG. 2) according to an Open Systems Interconnection (OSI) model network.

Figure 13:
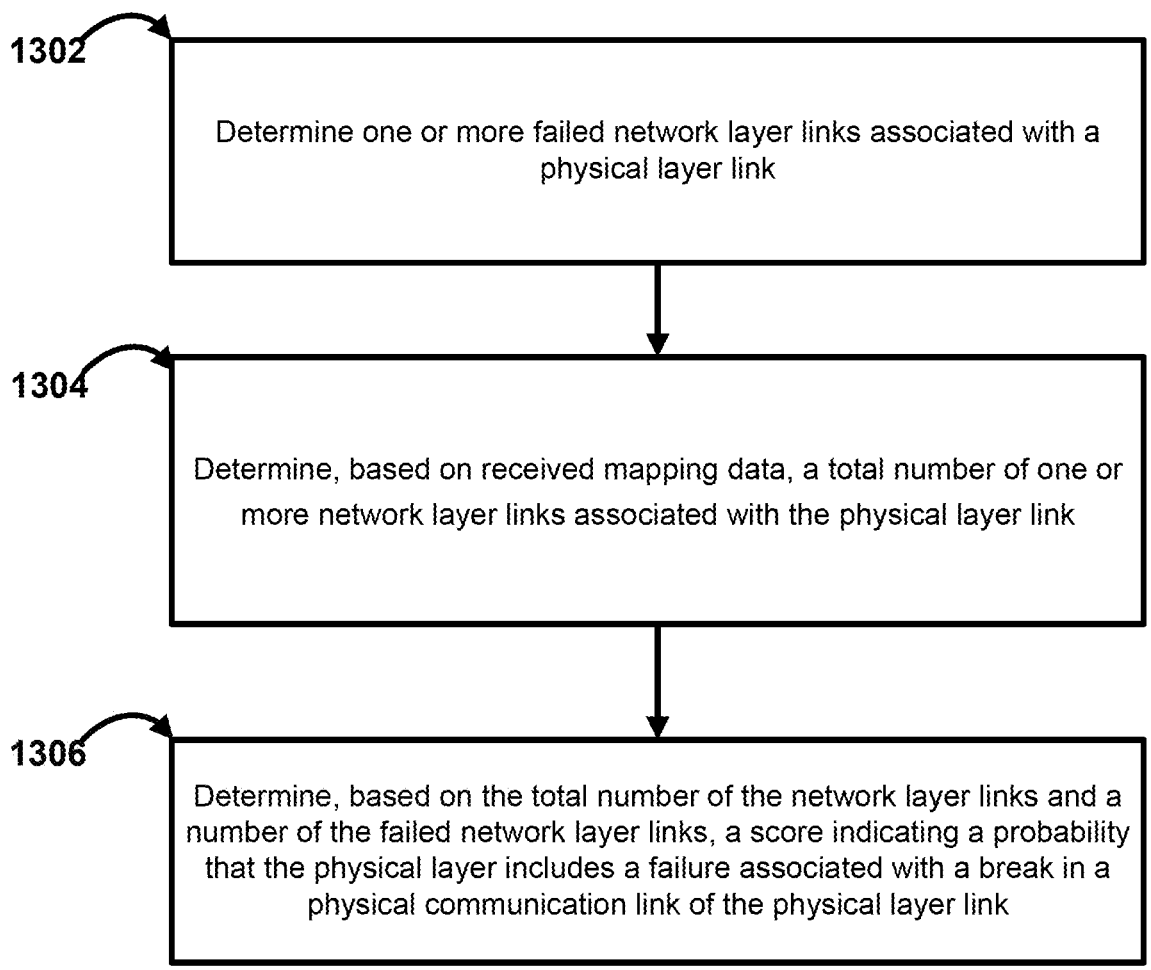
FIG. 13 is a flow chart of an example method.

FIG. 13 illustrates an example method for detecting one or more physical communication link breaks of a physical layer(s). At operation 1302, a communication device (e.g., network device 102) may determine one or more failed network layer links associated with a physical layer link. At operation 1304, the communication device may determine, based on received mapping data, a total number/quantity (e.g., 4) of one or more network layer links associated with the physical layer link. An example of the mapping data may be the mapping data of table 600 or the mapping data of table 1100. In some examples, the network layer links may be layer 3 links 702, 706, 708, 710, etc. and the physical layer link may be a layer 1 link.

At operation 1306, the communication device may determine, based in part on the total number/quantity of the network layer links and a number/quantity of the failed network layer links, a score indicating a probability that the physical layer link comprises a failure associated with a break in a physical communication link of the physical layer link. As an example, the total number of network layer links may be 4 and the number of failed network layer links (e.g., L3 links) may be 3, as shown at row 1 in FIG. 11. The score may be an S score such as, for example, 0.656, as shown in FIG. 11.

Figure 14:
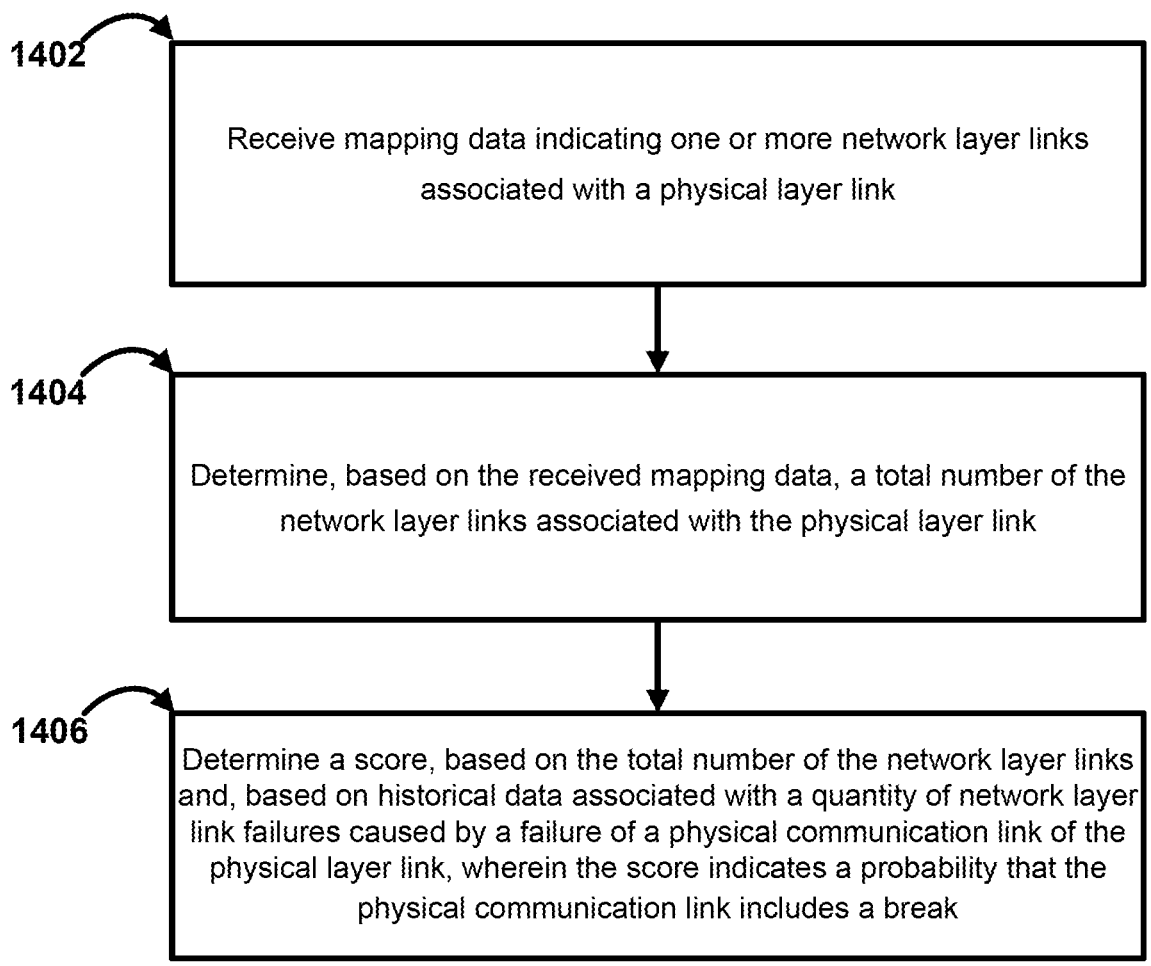
FIG. 14 is a flow chart of an example method.

FIG. 14 illustrates another example method for detecting one or more physical communication link breaks of a physical layer(s). At operation 1402, a communication device (e.g., network device 102) may receive mapping data indicating one or more network layer links associated with a physical layer link. An example of the mapping data may be the mapping data of table 600 or the mapping data of table 1100. In some examples, the network layer links may be layer links 702, 706, 708, 710, etc. and the physical layer link may be a layer 1 link. At operation 1404, the communication device may determine, based on the received mapping data, a total quantity/number (e.g., 4) of the network layer links associated with the physical layer.

At operation 1406, the communication device may determine a score, based in part on the total quantity/number of the network layer links and, based on historical data associated in part with a quantity/number of one or more network layer link failures caused by a failure of a physical communication link of the physical layer link, wherein the score indicates a probability that the physical communication link comprises a break. In some examples, the network layer link failures may be caused by a prior failure of the physical communication link of the physical layer link during a time period. The score may be a S score such as, for example, 0.656 as shown in FIG. 11. An example of the physical communication link may be a physical transmission medium (e.g., one or more fibers) of layer 1 link 704 and an example of network layer link failures may be layer 3 link failures. In some examples, the quantity/number of network layer link failures caused by the prior failure of the physical communication link of the physical layer (e.g., layer 1) may be divided by a total number of network layer link failures during a time period. The historical data may be used by the layer analyzer module 411 of a communication device (e.g., network device 102) to update the prior probability a, as described above. Also, in some examples the break may comprise a cut(s)/tear(s) of one or more fibers in the physical communication link of the physical layer.

In some examples, the layer analyzer module 411 may assign a high popularity level to the physical layer based on the total number of the network layer links on the path of the physical layer exceeding a predetermined threshold (e.g., exceeding 5 network layer links). The layer analyzer module 411 may determine that the high popularity level results in the determined score including a value higher than a score associated with a low popularity level. In some other examples, the layer analyzer module 411 may assign a low popularity level to a physical layer based on the total number of the network layer links on the path of the physical layer being below the predetermined threshold (e.g., below 3 network layer links). The popularity of a physical layer (e.g., physical layer link) may be defined as the number of layer 3 links that are on the communication path of the physical layer. The value of the score may increase the higher the popularity.

Figure 15:
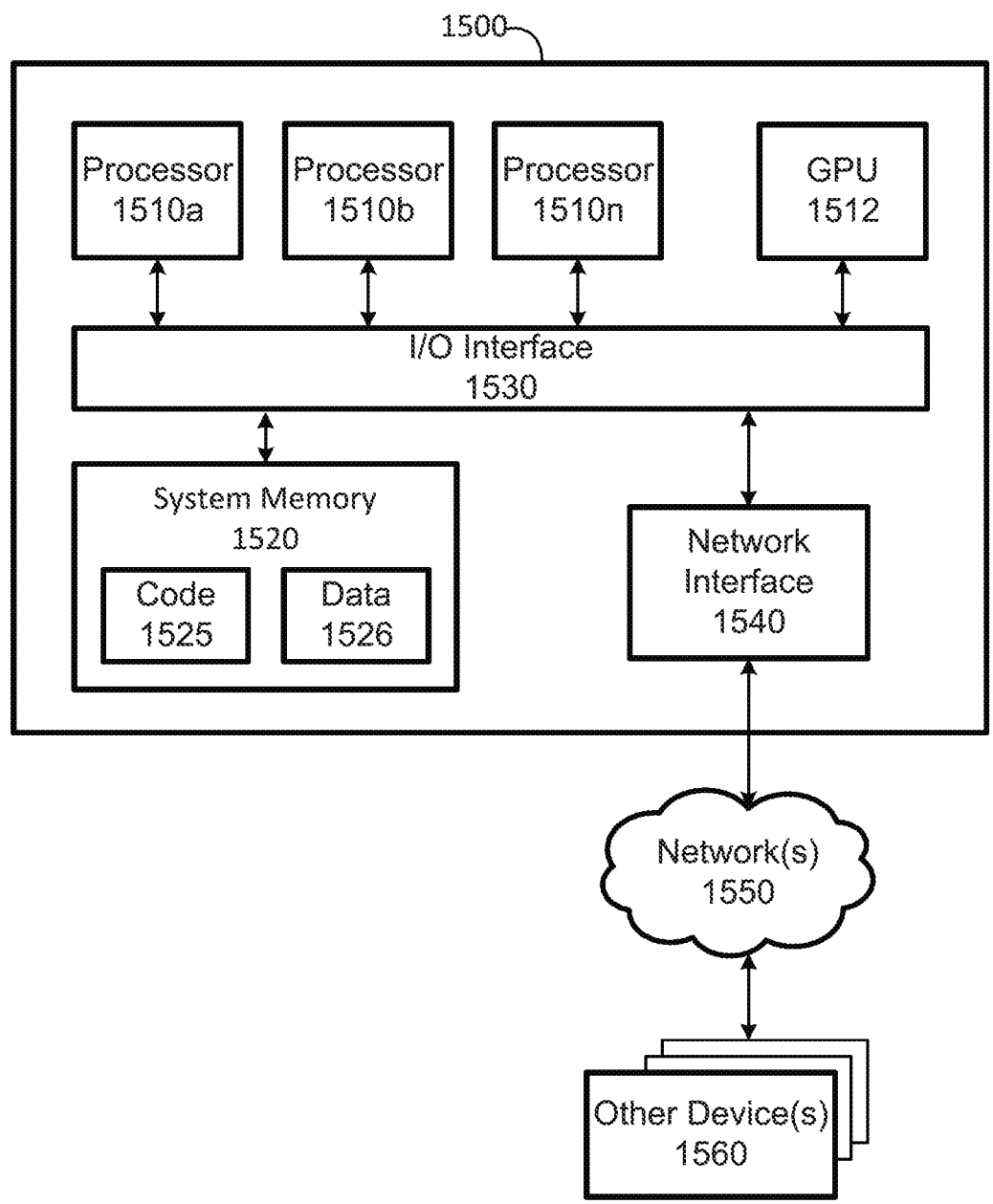
FIG. 15 is a block diagram of an example computing system.

FIG. 15 depicts an example computer system that comprises or is configured to access one or more computer-accessible media such as, for example, computing device 1500 capable of executing software for performing operations as described above in connection with FIGS. 1-14. In the illustrated example embodiment, the computing device 1500 may comprise one or more processors 1510a, 1510b, and/or 1510n (which may be referred herein singularly as the processor 1510 or in the plural as the processors 1510) coupled to a system memory 1520 via an input/output (I/O) interface 1530. The computing device 1500 may further comprise a network interface 1540 coupled to an I/O interface 1530.

In various embodiments, the computing device 1500 may be a uniprocessor system including one processor 1510 or a multiprocessor system including several processors 1510 (e.g., two, four, eight, or another suitable number). The processors 1510 may be any suitable processors capable of executing instructions. For example, in various embodiments, the processor(s) 1510 may be special-purpose or embedded processors implementing any of a variety of instruction set architectures (ISAs), such as the x86, PowerPC, SPARC, or MIPS ISAs, or any other suitable ISA. In multiprocessor systems, each of the processors 1510 may commonly, but not necessarily, implement the same ISA.

In some embodiments, a graphics processing unit ("GPU") 1512 may participate in providing graphics rendering and/or physics processing capabilities. A GPU may, for example, comprise a highly parallelized processor architecture specialized for graphical computations. In some embodiments, the processors 1510 and the GPU 1512 may be implemented as one or more of the same type of device.

The system memory 1520 may be configured to store instructions and data accessible by the processor(s) 1510. In various embodiments, the system memory 1520 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques and data described above, are shown stored within the system memory 1520 as code 1525 and data 1526.

In one embodiment, the I/O interface 1530 may be configured to coordinate I/O traffic between the processor(s) 1510, the system memory 1520 and any peripherals in the device, including a network interface 1540 or other peripheral interfaces. In some embodiments, the I/O interface 1530 may perform any necessary protocol, timing or other data transformations to convert data signals from one component (e.g., the system memory 1520) into a format suitable for use by another component (e.g., the processor 1510). In some embodiments, the I/O interface 1530 may include support for devices attached through various types of peripheral buses, such as a variant of the Peripheral Component Interconnect (PCI) bus standard or the Universal Serial Bus (USB) standard, for example. In some embodiments, the function of the I/O interface 1530 may be split into two or more separate components, such as a north bridge and a south bridge, for example. Also, in some embodiments some or all of the functionality of the I/O interface 1530, such as an interface to the system memory 1520, may be incorporated directly into the processor 1510.

The network interface 1540 may be configured to allow data to be exchanged between the computing device 1500 and other device or devices 1560 attached to a network or networks 1550, such as other computer systems or devices, for example. In various embodiments, the network interface 1540 may support communication via any suitable wired or wireless general data networks, such as types of Ethernet networks, for example. Additionally, the network interface 1540 may support communication via telecommunications/telephony networks, such as analog voice networks or digital fiber communications networks, via storage area networks, such as Fibre Channel SANs (e.g., storage area networks), or via any other suitable type of network and/or protocol.

In some embodiments, the system memory 1520 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may comprise non-transitory storage media or memory media, such as magnetic or optical media, e.g., disk or DVD/CD coupled to computing device the 1500 via the I/O interface 730. A non-transitory computer-accessible storage medium may also comprise any volatile or non-volatile media, such as RAM (e.g., SDRAM, DDR SDRAM, RDRAM, SRAM, etc.), ROM, etc., that may be included in some embodiments of the computing device 1500 as the system memory 1520 or another type of memory. Further, a computer-accessible medium may comprise transmission media or signals, such as electrical, electromagnetic or digital signals, conveyed via a communication medium, such as a network and/or a wireless link, such as those that may be implemented via the network interface 1540. Portions or all of multiple computing devices, such as those illustrated in FIG. 15, may be used to implement the described functionality in various embodiments; for example, software components running on a variety of different devices and servers may collaborate to provide the functionality. In some examples, portions of the described functionality may be implemented using storage devices, network devices or special-purpose computer systems, in addition to or instead of being implemented using other computer systems. The term "computing device," as used herein, refers to at least all these types of devices and is not limited to these types of devices.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may include any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computer or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example aspects. The example systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the present disclosure may be practiced with other computer system configurations.

Conditional language used herein, such as, among others, "may," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular aspect. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of aspects disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of aspects disclosed herein. The accompanying claims and their equivalents are intended to cover such forms or modifications as would fall within the scope and spirit of certain aspects disclosed herein.

The preceding detailed description is merely exemplary in nature and is not intended to limit the disclosure or the application and uses of the disclosure. The described aspects are not limited to use in conjunction with a particular type of machine. Hence, although the present disclosure, for convenience of explanation, depicts and describes particular machine, it will be appreciated that the assembly and electronic system in accordance with this disclosure may be implemented in various other configurations and may be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), Long Term Evolution (LTE), W-CDMA (Wideband Code-Division Multiple Access), Wireless Fidelity (Wi-Fi), Bluetooth, and/or the like, and/or a combination of two or more thereof.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It is to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and comprise the disclosed systems. These and other components are disclosed herein, and it is understood that when combinations, subsets, interactions, groups, etc. of these components are disclosed that while specific reference of each various individual and collective combination and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
receiving, by a network device, an indication of a failure of one or more network layer links;
determining, by the network device and based on the indication, and based on data indicating one or more associations between network layer links and physical layer links, a physical layer link associated with the one or more network layer links; and
determining, by the network device and based on a total quantity of the network layer links associated with the physical layer link, and based on a quantity of the one or more network layer links associated with the indication of the failure, a score indicating a probability that the physical layer link comprises a failure associated with a break in a physical communication link of the physical layer link.

2. The method of claim 1, wherein the physical communication link comprises one or more fibers.

3. The method of claim 2, wherein the physical layer communication link break comprises a cut or a tear in the one or more fibers.

4. The method of claim 1, further comprising:
determining that the physical communication link of the physical layer link is unlikely to comprise the break based on determining that the score is below a predetermined threshold.

5. The method of claim 1, further comprising:
causing, based on determining that the determined score exceeds a predetermined threshold, output of an indication denoting that the physical layer link is suspected to comprise the break in the physical communication link.

6. The method of claim 1, further comprising:
determining, based on the data, the total quantity of the network layer links associated with the physical layer link.

7. The method of claim 1, further comprising:
determining a maximum value of the determined score based in part on determining that the quantity of the one or more network layer links associated with the indication of the failure equals the total quantity of the network layer links associated with the physical layer link.

8. The method of claim 1, wherein the network layer links and the physical layer link are part of a protocol stack comprising a priority of layers according to an Open Systems Interconnection (OSI) model network, and wherein the physical layer link facilitates communication of data between communication devices via the physical communication link.

9. The method of claim 4, further comprising:
determining that the one or more network layer links associated with the indication of the failure are caused by a failure associated with an event other than the break in the physical communication link based on determining that the determined score is below the predetermined threshold.

10. The method of claim 1, further comprising:
determining the score based in part on evaluating historical data associated with a quantity of network layer link failures caused by a prior failure of the physical communication link of the physical layer link during a time period.

11. A method comprising:
determining, by a network device, one or more failed network layer links associated with a physical layer link;
determining, by the network device and based on received mapping data, a total quantity of one or more network layer links associated with the physical layer link; and
determining, by the network device, based in part on the total quantity of the network layer links and a quantity of the failed network layer links, a score indicating a probability that the physical layer link comprises a failure associated with a break in a physical communication link of the physical layer link.

12. The method of claim 11, wherein the physical communication link comprises one or more fibers.

13. The method of claim 11, further comprising:
determining the probability that the physical layer link comprises a failure associated with the break in the physical communication link of the physical layer link is low based on determining that the total quantity of the network layer links is one.

14. The method of claim 11, further comprising:
determining that the physical communication link of the physical layer link is unlikely to comprise the break based on determining that the score is below a predetermined threshold.

15. The method of claim 11, further comprising:
determining that the failed network layer links are associated with a failure caused by an event other than the break in the physical communication link based on determining that the score is below a predetermined threshold.

16. A method comprising:
receiving, by a network device, mapping data indicating one or more network layer links associated with a physical layer link;
determining, by the network device and based on the received mapping data, a total quantity of the network layer links associated with the physical layer link; and
determining, by the network device, a score based in part on a total quantity of the network layer links and, based in part on historical data associated with a quantity of one or more network layer link failures caused by a failure of a physical communication link of the physical layer link, wherein the score indicates a probability that the physical communication link comprises a break.

17. The method of claim 16, further comprising:
resetting the determined score to a value of zero in response to an indication verifying that there is no break in the physical communication link of the physical layer link even in an instance in which the determined score was initially above a predetermined threshold.

18. The method of claim 16, further comprising:
assigning a high popularity level to the physical layer link based on the total quantity of the network layer links associated with the physical layer link exceeding a predetermined threshold; and
determining that the high popularity level results in the determined score comprising a value higher than a score associated with a low popularity level.

19. The method of claim 18, further comprising:
assigning the low popularity level to another physical layer link based on a total number of network layer links associated with the another physical layer link being below the predetermined threshold.

20. The method of claim 16, wherein the physical communication link comprises one or more fibers.

* * * * *